United States Patent
Nakajima

(10) Patent No.: US 9,418,217 B2
(45) Date of Patent: Aug. 16, 2016

(54) INFORMATION PROCESSING SYSTEM AND INFORMATION PROCESSING METHOD

(71) Applicant: Masato Nakajima, Tokyo (JP)

(72) Inventor: Masato Nakajima, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/532,080

(22) Filed: Nov. 4, 2014

(65) Prior Publication Data

US 2015/0128231 A1    May 7, 2015

(30) Foreign Application Priority Data

Nov. 5, 2013  (JP) .................................. 2013-229103
Oct. 31, 2014  (JP) .................................. 2014-223086

(51) Int. Cl.
| | | |
|---|---|---|
| *G06F 21/45* | (2013.01) | |
| *G06F 21/31* | (2013.01) | |
| *G06F 21/44* | (2013.01) | |
| *H04L 29/06* | (2006.01) | |

(52) U.S. Cl.
CPC ............... *G06F 21/45* (2013.01); *G06F 21/31* (2013.01); *G06F 21/44* (2013.01); *H04L 63/083* (2013.01); *H04L 63/0876* (2013.01); *H04L 63/0853* (2013.01); *H04L 2463/082* (2013.01)

(58) Field of Classification Search
CPC ......... G06F 21/45; G06F 21/44; G06F 21/31; H04L 29/06; H04L 63/08; H04L 63/083; H04L 63/0876; H04L 63/0853

USPC ............................................................ 726/9
See application file for complete search history.

(56) References Cited

U.S. PATENT DOCUMENTS

| | | | |
|---|---|---|---|
| 2013/0188221 A1* | 7/2013 | Ohno .................... | G06F 3/1296 358/1.15 |
| 2014/0033292 A1* | 1/2014 | Moore .................... | G06F 21/35 726/9 |

FOREIGN PATENT DOCUMENTS

| | | |
|---|---|---|
| JP | 2004-341409 | 12/2004 |
| JP | 4670507 | 4/2011 |

* cited by examiner

*Primary Examiner* — Jeffrey Pwu
*Assistant Examiner* — Samuel Ambaye
(74) *Attorney, Agent, or Firm* — IPUSA, PLLC

(57) ABSTRACT

An information processing system includes a device registration unit that stores device identification information of a device in a first storage unit in response to a device identification information registration request, a generation unit that generates user identification information of an unspecified user of the device, an authentication unit that performs authentication in response to an authentication request from the device and associates user identification information of a specified user specified in the authentication request with the device when the authentication performed in response to the authentication request is successful, and a processing unit that executes a process according to the user identification information associated with the device in response to a request from the device that has been successfully authenticated. Upon receiving an authentication request that does not specify user identification information, the authentication unit associates the user identification information generated by the generation unit with the device.

4 Claims, 12 Drawing Sheets

| TENANT ID | USER ID | PASSWORD | ROLE |
|---|---|---|---|
| 123 | ID0001 | pwd0001 | ADMINISTRATOR |
| 123 | ID002 | pwd002 | GENERAL |
| 123 | ID002 | pwd002 | GENERAL |
| : | : | : | : |

| TENANT ID | DEVICE ID | DEVICE NAME | DEVICE TYPE | LOCATION |
|---|---|---|---|---|
| 123 | Device-0001 | AAA | A4 COLOR | xxx OFFICE |
| 123 | Device-0002 | BBB | A3 COLOR | yyy OFFICE |
| : | : | : | : | : |

| TENANT ID | USER ID | PASSWORD | ROLE |
|---|---|---|---|
| 123 | ID0001 | pwd0001 | ADMINISTRATOR |
| 123 | ID002 | pwd002 | GENERAL |
| 123 | ID002 | pwd002 | GENERAL |
| : | : | : | : |
| 123 | !anonymous!Device-0001 | ANpwd0002 | ANONYMOUS |

INFORMATION PROCESSING SYSTEM AND INFORMATION PROCESSING METHOD

BACKGROUND OF THE INVENTION

1. Field of the Invention

The present invention relates to an information processing system and an information processing method.

2. Description of the Related Art

Devices such as image forming apparatuses that can use cloud services and other services provided via a network are known. For example, a cloud service may be used to upload image data scanned by a device to a predetermined online storage.

Devices installed in an office and similar environments may be shared by a plurality of users. As such, a user authentication function may be implemented in a cloud service in order to prevent unauthorized use of the cloud service via the device (see e.g. Japanese Patent No. 4670507 and Japanese Laid-Open Patent Publication No. 2004-341409).

However, requiring a user to input authentication information each time the user wishes to use the device may impose an operation burden on the user. Meanwhile, when a device is placed within a limited space such as an office, its users are most likely persons that can be trusted.

In view of the above, an aspect of the present invention is directed to improving operability for using a service provided via a network from a device.

SUMMARY OF THE INVENTION

According to one embodiment of the present invention, an information processing system is provided that includes at least one computer. The information processing system includes a device registration unit configured to store device identification information of a device in a first storage unit in response to a device identification information registration request, a generation unit configured to generate user identification information of an unspecified user of the device that has the device identification information stored in the first storage unit, an authentication unit configured to perform authentication in response to an authentication request from the device that has the device identification information stored in the first storage unit. When the authentication performed in response to the authentication request based on information specified in the authentication request is successful, the authentication unit associates user identification information of a specified user specified in the authentication request with the device. The information processing system further includes a processing unit configured to execute a process according to the user identification information associated with the device by the authentication unit, the process being executed in response to a request transmitted from the device that has been successfully authenticated based on the authentication request. When the authentication unit receives from the device an authentication request that does not specify user identification information, the authentication unit associates the user identification information of the unspecified user generated by the generation unit with the device.

BRIEF DESCRIPTION OF THE DRAWINGS

FIG. 6 illustrates an exemplary configuration of a user information storage unit;

FIG. 7 illustrates an exemplary configuration of a device information storage unit;

FIG. 8 illustrates an example in which a record of an anonymous user is registered in the user information storage unit;

DESCRIPTION OF THE PREFERRED EMBODIMENTS

Figure 1:
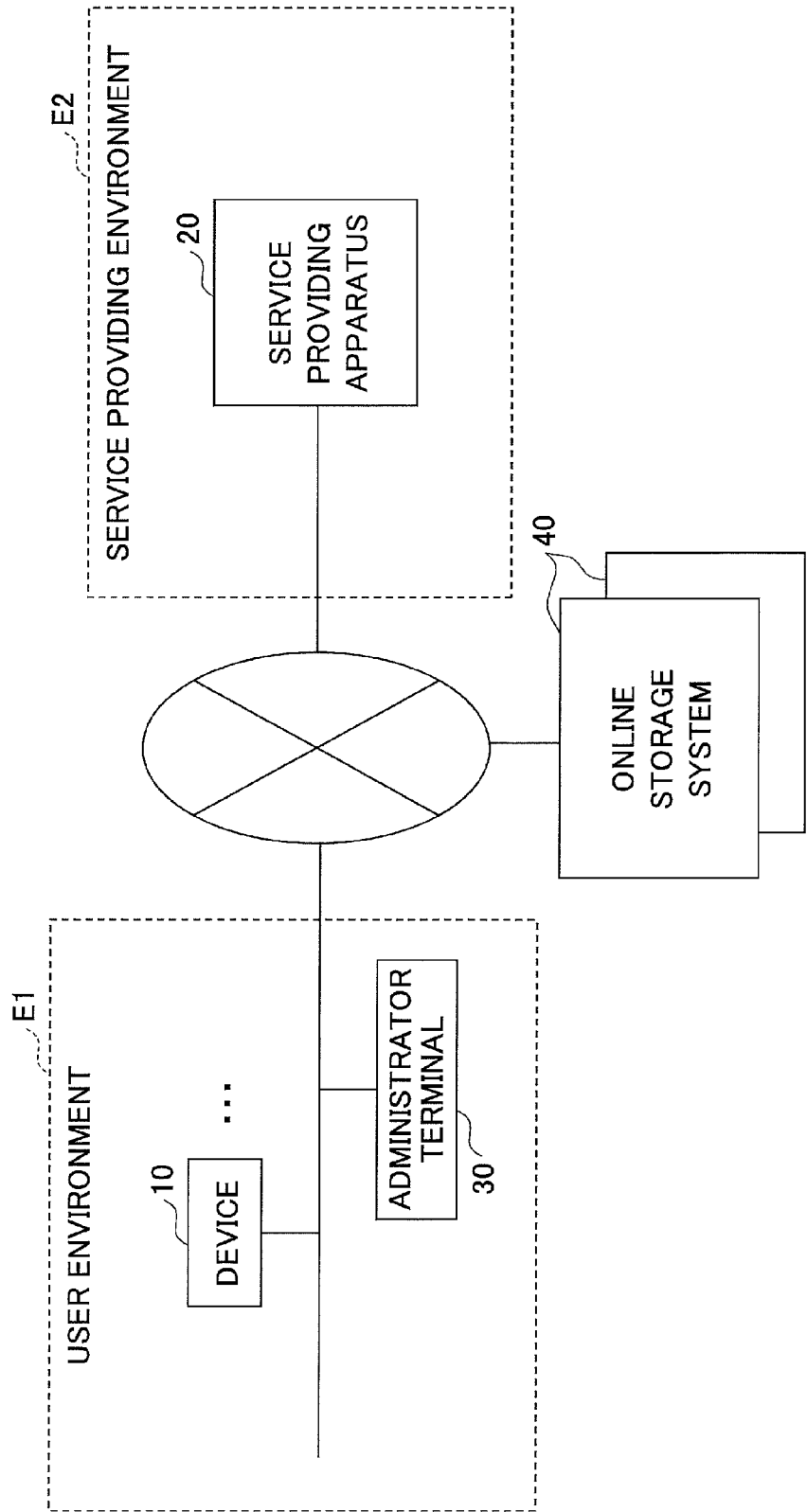
FIG. 1 illustrates an exemplary configuration of an information processing system according to a first embodiment of the present invention.

In the following, embodiments of the present invention are described with reference to the accompanying drawings. FIG. 1 illustrates an exemplary configuration of an information processing system 1 according to a first embodiment of the present invention. The information processing system 1 illustrated in FIG. 1 includes a user environment E1, a service providing environment E2, and an online storage system 40, which may communicate with one another via a wide area network such as the Internet.

The service providing environment E2 is a system environment within an organization that provides a cloud service via a network. Note that although a cloud service is described below as a specific example of the service used, the present embodiment may also be applied to other types of services provided via a network, such as services provided by an application service provider (ASP) and web services.

The service providing environment E2 includes a service providing apparatus 20. The service providing apparatus 20 provides predetermined services via a network. Services provided by the service providing apparatus 20 include a cloud scan service. The cloud scan service refers to a service of uploading image data scanned by a device 10 and transferred from the device 10 to a predetermined storage. Note that in some embodiments, the service providing apparatus 20 may be arranged within the user environment E1. That is, the service providing environment E2 may be included within the user environment E1.

The user environment E1 is a system environment within an organization such as a corporation that uses the device 10. The user environment E1 includes at least one device 10 and an administrator terminal 30 that are interconnected via a network such as a local area network (LAN). In the present embodiment, the device 10 corresponds to an image forming apparatus having a scanning function. For example, the device 10 may be a multifunction peripheral (MFP) having multiple functions such as a print function, a copy function, and a facsimile (fax) function in addition to the scanning function.

The administrator terminal 30 is a terminal used by an administrator user within the user environment E1. The administrator user refers to a user that is given special authority with respect to the cloud scan service. Examples of the administrator terminal 30 include a PC (personal computer), a PDA (personal digital assistant), a tablet type terminal, a smartphone, and a mobile phone.

The online storage system 40 is a computer system that provides a cloud service referred to as "online storage" via a network. Online storage is a service of providing a storage area of a storage. In the present embodiment, the storage area provided by the online storage corresponds to an uploading destination candidate for uploading image data using the cloud scan service provided by the service providing apparatus 20.

Figure 2:
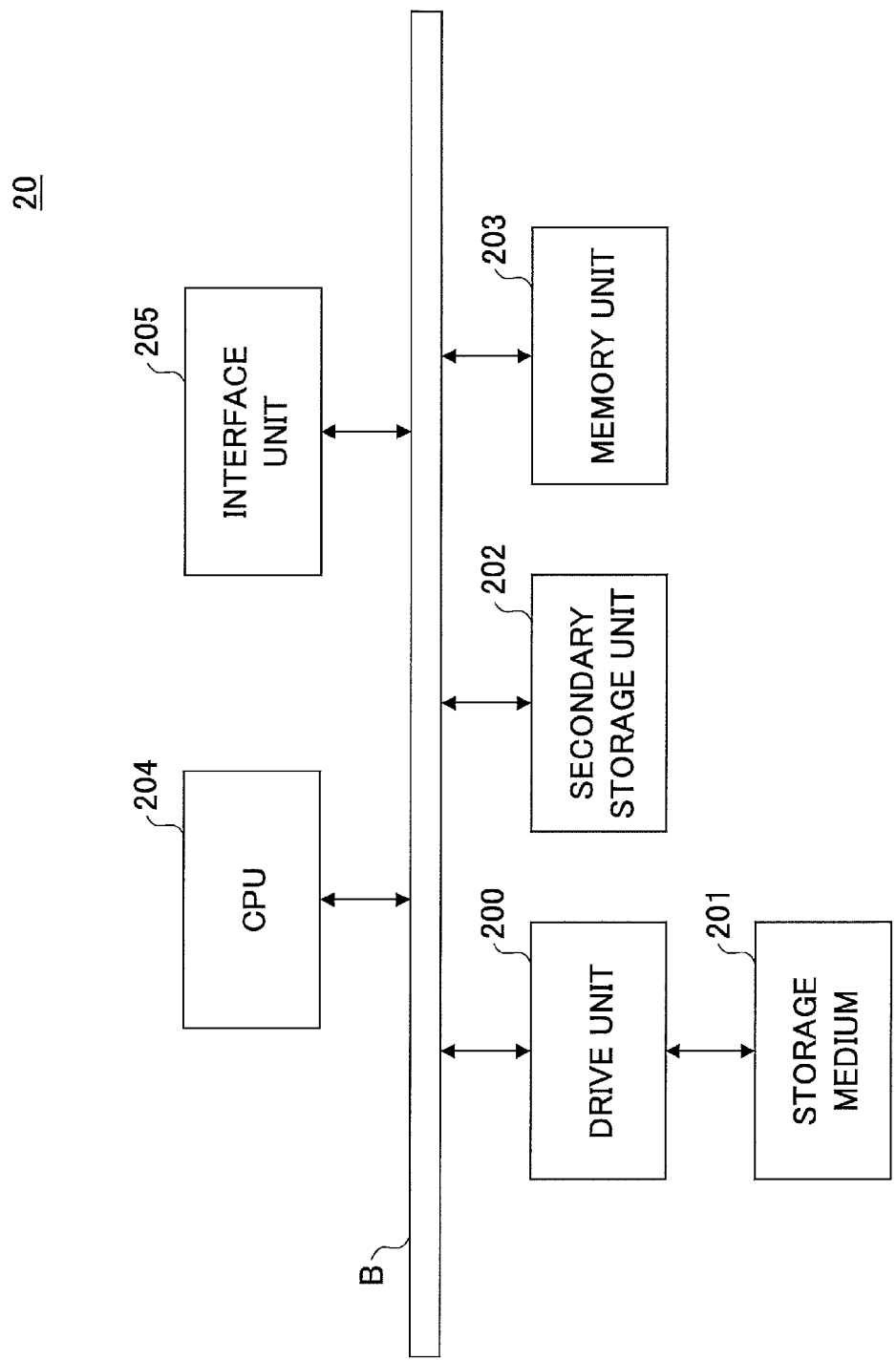
FIG. 2 illustrates an exemplary hardware configuration of a service providing apparatus according to the first embodiment.

FIG. 2 is a diagram illustrating an exemplary hardware configuration of the service providing apparatus 20 according to the first embodiment. In FIG. 2, the service providing apparatus 20 includes a drive unit 200, a secondary storage unit 202, a memory unit 203, a central processing unit (CPU) 204, and an interface (I/F) unit 205 that are interconnected by a bus B.

A program that implements processes in the service providing apparatus 20 may be provided by a storage medium 201 such as a CD-ROM. When the storage medium 201 storing a program is loaded into the drive unit 200, the program may be installed in the secondary storage unit 202 from the storage medium 201 via the drive unit 200. The program, however, does not necessarily have to be installed from the storage medium 201, and may be downloaded from other computers via a network, for example. The secondary storage unit 202 stores files and data in addition to installed programs.

The memory unit 203 reads a program from the secondary storage unit 202 and stores the read program in response to an instruction to activate the program. The CPU 204 implements functions of the service providing apparatus 20 by executing a relevant program stored in the memory unit 203. The interface unit 205 is used as an interface for establishing connection with a network.

In some embodiments, the service providing apparatus 20 may be configured by a plurality of computers each having the hardware configuration as illustrated in FIG. 2, for example. That is, in some embodiments, process operations of the service providing apparatus 20 described below may be implemented by a plurality of computers.

Figure 3:
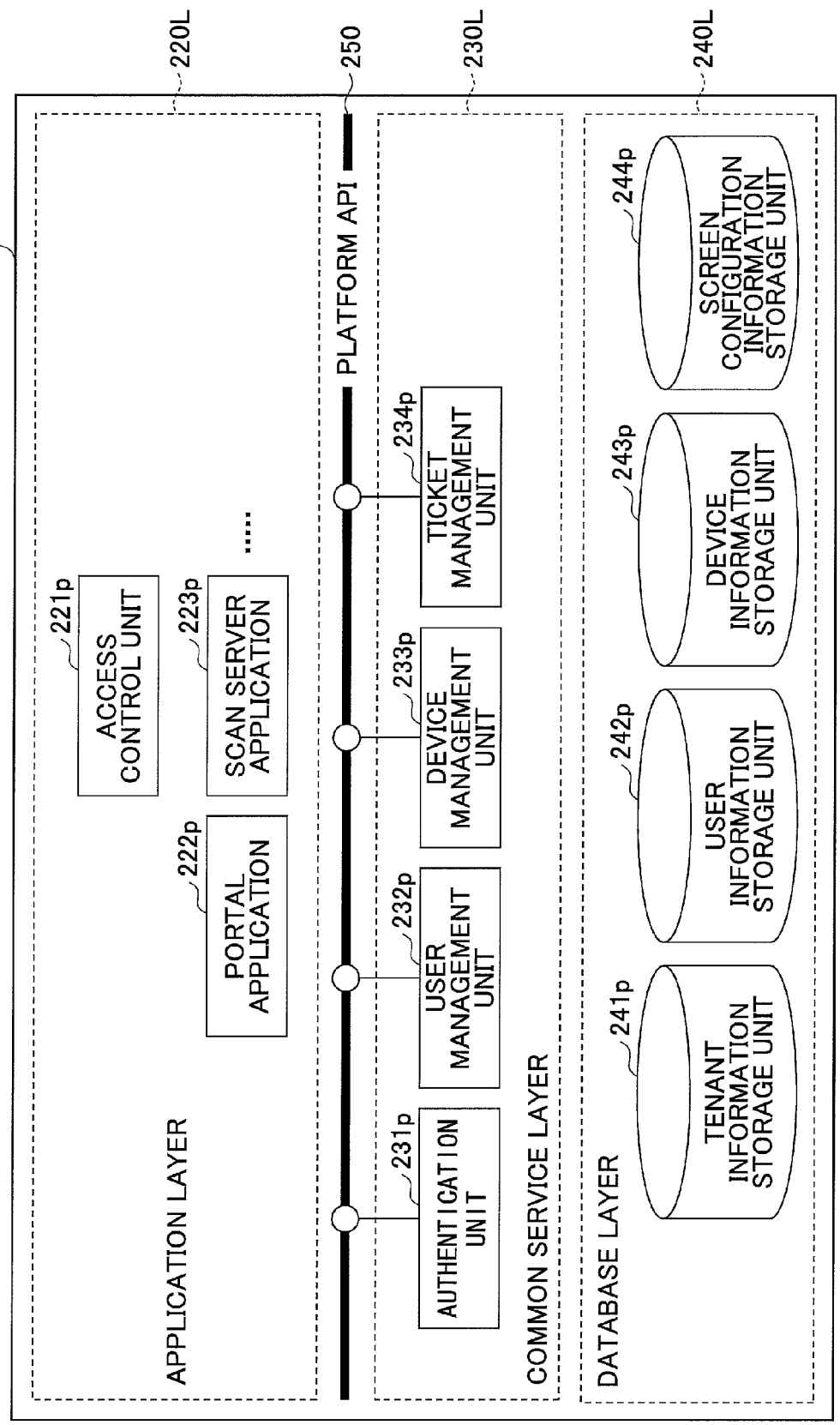
FIG. 3 illustrates an exemplary functional configuration of the service providing apparatus according to the first embodiment.

FIG. 3 is a diagram illustrating an exemplary functional configuration of the service providing apparatus 20 according to the first embodiment. In FIG. 3, functional elements of the service providing apparatus 20 are divided into three layers including an application layer 220L, a common service layer 230L, and a database layer 240L.

The application layer 220L is a layer for implementing server-side applications related to the cloud scan service (referred to as "server application" hereinafter). In FIG. 3, the application layer 220L includes an access control unit 221$p$, a portal application 222$p$, and a scan server application 223$p$. The portal application 222$p$ is a server application for providing a portal site of the cloud scan service. The portal site may be used to register user information and set up setting information for each user with respect to a service application, for example. The scan server application 223$p$ is a server application for executing server-side processes related to the above-described cloud scan service. Note that server applications for implementing services other than the cloud scan service may be added to the application layer 220L. The access control unit 221$p$ is configured to control access to the server application.

The common service layer 230L includes functions common to multiple service applications and/or basic functions commonly used by multiple service applications, for example. Functions of the common service layer 230L may be called via a platform API (application programming interface) 250. Basically, the platform API 250 is called by a service application of the application layer 220L or the device 10. Note that the platform API 250 may be made public to a party other than the operator of the service providing apparatus 20 such as a third party vendor. In this case, the server application may be implemented by the third party vendor, for example. That is, server applications may be developed and added as desired using the platform API 250.

In FIG. 3, the common services layer 230L includes an authentication unit 231$p$, a user management unit 232$p$, a device management unit 233$p$, and a ticket management unit 234$p$. The authentication unit 231$p$ performs authentication and authorization with respect to a user or a device 10 that is attempting to access the service providing apparatus 20. Note that authorization refers to determining whether to allow a user or a device 10 access to a service. The user management unit 232$p$ executes a process for managing information relating to a user (referred to as "user information" hereinafter). The device management unit 233$p$ executes a process for managing information relating to the device 10 that is capable of cooperating with the service providing device 20 (referred to as "device information" hereinafter). The ticket management unit 234$p$ executes processes such as generation, verification, and management of an authentication ticket. Note that an authentication ticket refers to data indicating that a user has been authenticated. For example, the authentication ticket may be implemented by a cookie. Also, in some embodiments, the authentication ticket may have an expiration date.

The database layer 240L is a layer that includes various databases storing various types of information. In FIG. 3, the database layer 240L includes a tenant information storage unit 241$p$, a user information storage unit 242$p$, a device information storage unit 243$p$, and a screen configuration information storage unit 244$p$.

The tenant information storage unit 241$p$ stores attribute information of each tenant of the service providing device 20 (referred to as "tenant information" hereinafter). A tenant refers to a user unit (contracting organization) that has entered into a contract to use the cloud scan service. For example, the tenant may be a group of one or more users such as a company or some other organization. In the present embodiment, it is assumed that one user environment E1 corresponds to one tenant. The tenant information may include information items such as a tenant ID for identifying each tenant, for example. The user information storage unit 242$p$ stores user information relating to each individual user belonging to the tenant (simply referred to as "user" hereinafter). The user information may include information items such as a user ID for identifying each user and a password for authenticating the user, for example. The user information may also include the tenant ID to which the user belongs. In this way, uniqueness of the user ID may only have to be secured within each tenant. That is, in the present embodiment, each user is identified by a combination of the user ID and the tenant ID.

The device information storage unit 243*p* stores device information of each device 10 used by the tenant in association with the tenant ID of the tenant. The device information may include information items such as identification information for identifying each device 10 (referred to as "device ID" hereinafter), for example.

The screen configuration information storage unit 244*p* stores configuration information of a screen to be displayed on the device 10 upon using the cloud scan service (referred to as "screen configuration information" hereinafter). The screen configuration information may be set up beforehand by an administrator user, and stored in association with a tenant ID and a user ID, for example.

Note that in a case where the service providing apparatus 20 is configured by a plurality of computers, the application layer 220L, the common service layer 230L, and the database layer 240L may each form a network segment. Each element belonging to each layer may be implemented by a computer connected to the network segment of the corresponding layer.

Figure 4:
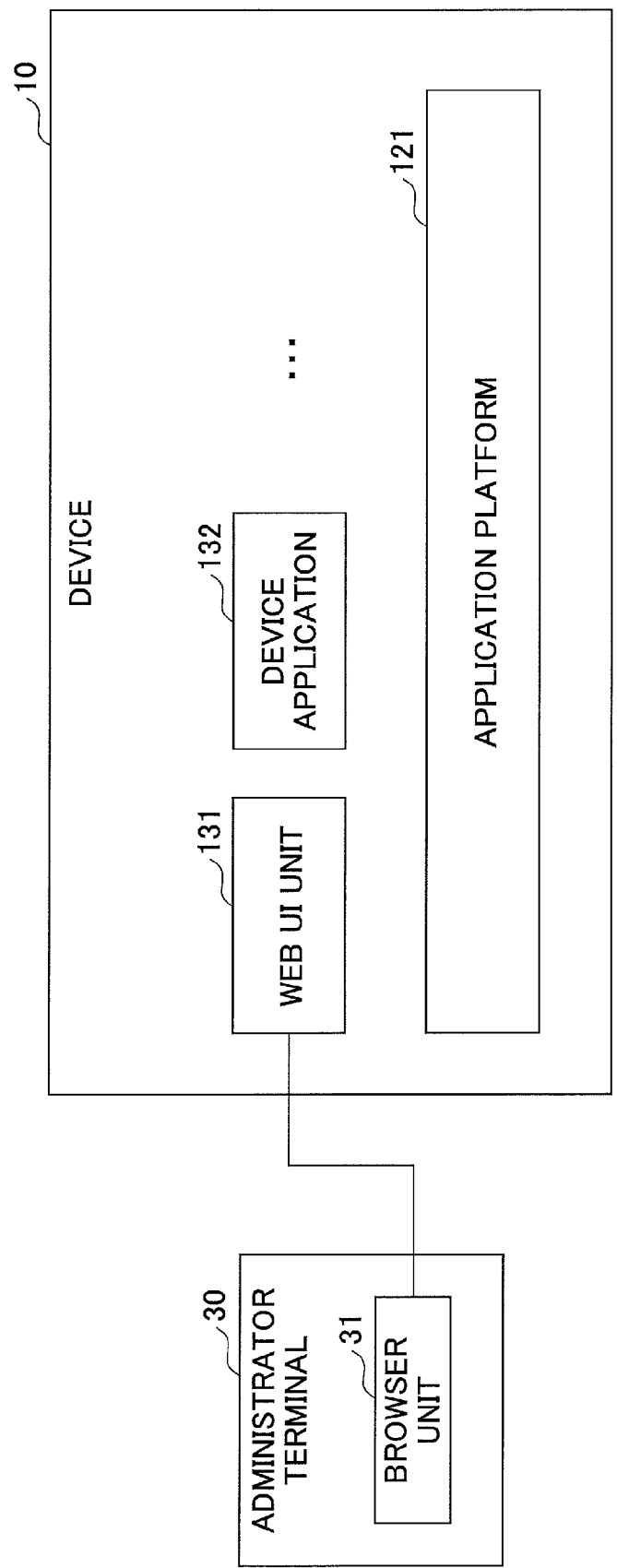
FIG. 4 illustrates an exemplary functional configuration of a device according to the first embodiment.

FIG. 4 is a diagram illustrating an exemplary functional configuration of the device 10 according to the first embodiment. In FIG. 4, the device 10 includes a web UI unit 131, a device application 132, and an application platform 121. These functional elements may be implemented by processes that are executed by a CPU of the device 10 based on one or more programs installed in the device 10, for example.

The web UI unit 131 uses a network to provide a user interface through a web page. In the present embodiment, the web UI unit 131 provides a user interface through a web page to the administrator terminal 30.

The device application 132 is an example of an application program installed in the device 10 for implementing the scan cloud service. For example, the device application 132 may be paired up with the scan server application 223*p* to cooperate with the scan server application 223*p* to implement the cloud scan service. For example, the device application 132 may prompt the device 10 to scan a document and transmit image data of the scanned document to the scan server application 223*p*.

The application platform 121 provides an environment for implementing the web UI unit 131 and the device application 132, for example.

Note that in FIG. 4, the administrator terminal 30 includes a browser unit 31. The browser unit 31 may be implemented by a process executed by a CPU of the administrator terminal 30 based on a web browser application program installed in the administer terminal 30, for example. The browser unit 31 may be configured to display a web page provided by the web UI unit 131 and execute a process in response to an input to the web page, for example.

Figure 5:
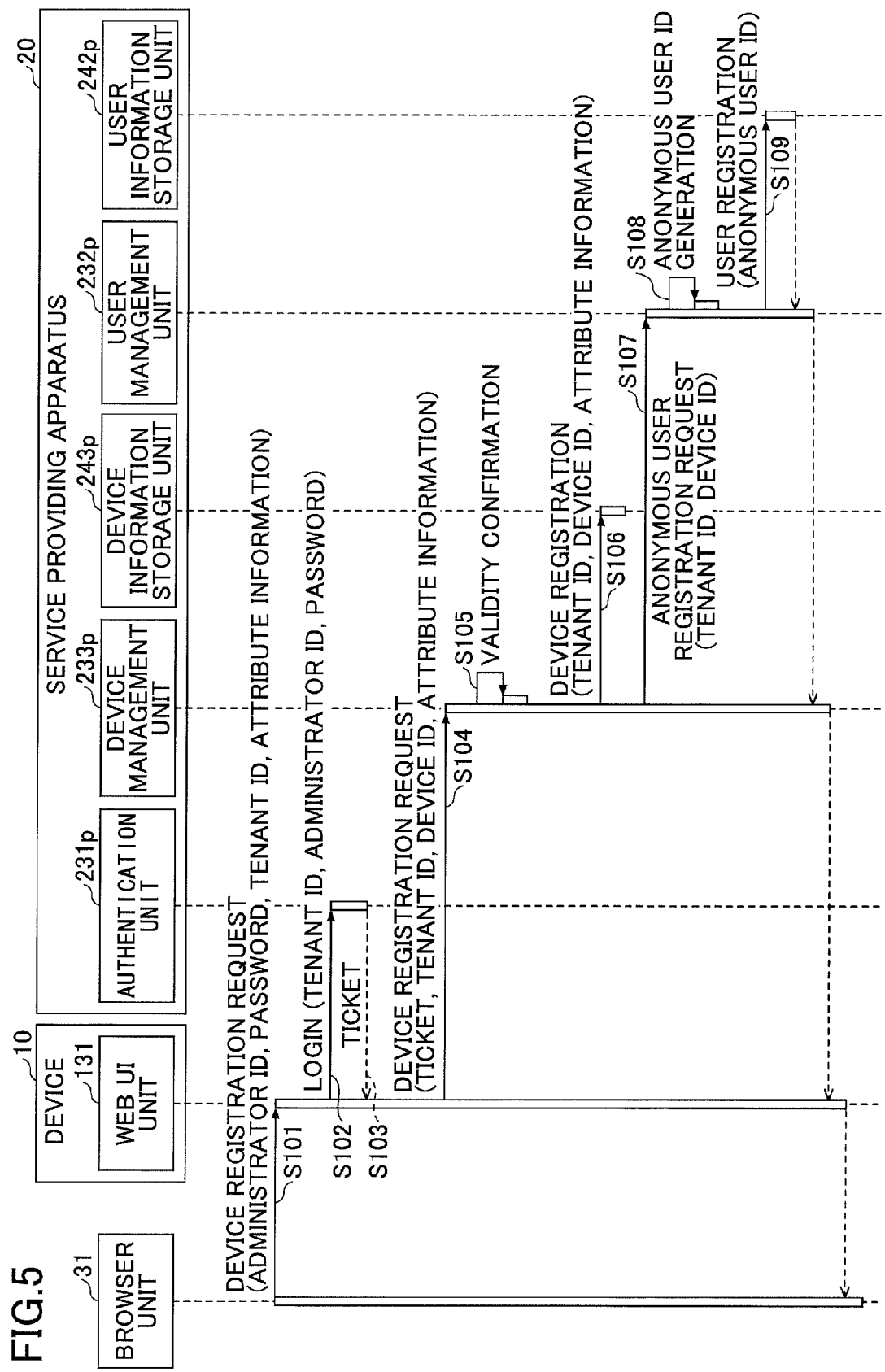
FIG. 5 is a sequence chart illustrating exemplary process steps of a registration process for registering a device that is to cooperate with the service providing apparatus according to the first embodiment.

In the following, process steps executed in the information processing system 1 are described. FIG. 5 is a sequence chart illustrating exemplary process steps of a registration process for registering the device 10 that is to cooperate with the service providing apparatus 20 according to the first embodiment. Note that in the present embodiment, the device 10 that is to cooperate with the service providing apparatus 20 corresponds to the device 10 that transmits scanned image data as processing data of the cloud scan service to the service providing apparatus 20. The service providing apparatus 20 requires pre-registration of the device 10 in order to prevent unrestricted access from unauthorized devices.

In the present example, it is assumed that a device registration screen is displayed at the administrator terminal 30 by the browser unit 31 at the start of the process sequence of FIG. 5. For example, the browser unit 31 may prompt the administrator terminal 30 to display the device registration screen based on a web page provided by the web UI unit 131 of the device 10 to be registered.

When an administrator user enters information such as a user ID, an administrator user password, a tenant ID, and attribute information of the device 10 to be registered via the device registration screen, the browser unit 31 transmits a device registration request specifying the input information to the web UI unit 131 (step S101). The attribute information of the device 10 may include information indicating the location of the device 10, for example. Note that although an administrator user is described as an operator in the present example, the process of FIG. 5 may also be performed in response to operations made by a customer engineer or the like, for example.

Upon receiving the device registration request, the web UI unit 131 transmits a login request specifying the tenant ID, the administrator ID, and the password specified in the device registration request to the authentication unit 231*p* of the service providing apparatus 20 (step S102). Note that transmitting the login request corresponds to calling a method of the platform API 250.

The authentication unit 231*p* refers to the user information storage unit 242*p* to determine whether authentication based on the tenant ID, the user ID, and the password specified in the login request is successful.

FIG. 6 is a table illustrating an exemplary configuration of the user information storage unit 242*p*. In FIG. 6, the user information storage unit 242*p* stores, for each user belonging to the tenant, the tenant ID of the tenant, the user ID of the user, the password of the user, and a role of the user. Note that the role is a concept used to distinguish or identify the authority given to a user with respect to a service provided by the service providing apparatus 20. In the present embodiment, values of the role include "administrator", "general", and "anonymous". "Administrator" is a role for the administrator user. "General" is a role for a general user. The administrator user is given the authority to register/delete various types of information including device information and user information, for example, and is also given the authority to execute a job of the cloud scan service. The general user is given the authority to execute a job of the cloud scan service. The authority given to the general user is more limited compared to the authority given to the administrator user. Information indicating the scope of authority assigned to a role may be stored in the secondary storage unit 202, for example. Such information may be information indicating, for each role, whether authority is given to call each method (each interface) of the platform API 250, for example.

Note that the role "administrator" or "general" of a user may be acquired upon starting use of the cloud scan service by entering a user ID and a password corresponding to the role and logging in, for example.

On the other hand, "anonymous" is a role that is assigned at the start of the cloud scan service to a user that does not enter a user ID and a password (referred to as "anonymous user" hereinafter). In other words, an anonymous user is an unspecified user. The authority given to the anonymous user may be the same as the authority given to the general user, or the authority given to the anonymous user may be more limited compared to the authority given to the general user.

Note that FIG. 6 illustrates an example in which a record for an anonymous user is not registered in the user information storage unit 242p.

The authentication unit 231p may determine that authentication is successful when the combination of the tenant ID, the user ID, and the password included in the login request is stored in the user information storage unit 242p.

If authentication is successful, the authentication unit 231p generates an authentication ticket and returns a response including the generated authentication ticket to the web UI unit 131 (step S103). If authentication is unsuccessful, the authentication ticket is not generated, and a response indicating that the authentication has failed is returned to the web UI unit 131. In this case, subsequent process steps are not executed. Note that strictly speaking, the authentication ticket is generated by the ticket management unit 234p, but in FIG. 5, an illustration of the ticket management unit 234p is omitted for the sake of convenience. The ticket management unit 234p may store the generated authentication ticket in the memory unit 203 in association with the tenant ID and the user ID that have been successfully authenticated, and the role assigned to the user ID, for example.

Upon receiving the authentication ticket, the web UI unit 131 transmits a device registration request specifying the received authentication ticket, the tenant ID, a device ID, and the attribute information of the device 10 to the device management unit 233p of the service providing apparatus 20 (step S104). Note that transmitting the device registration request corresponds to calling a method of the platform API 250. Note that the attribute information and the tenant ID specified in the device registration request from the web UI unit 131 may be the same as those specified in the device registration request issued in step S101. The device ID is identification information of the device 10. That is, the web UI unit 131 acquires the device ID from the device 10 and specifies the acquired device ID in the device registration request.

Upon receiving the device registration request, the device management unit 233p confirms the validity of the device registration request (step S105). For example, the confirmation may involve determining the validity of the authentication ticket specified in the device registration request, and determining whether the role stored in association with the authentication ticket is given the authority to implement the device registration request. If the authentication ticket is invalid, or authority to implement the device registration request is not assigned to the role stored in association with the authentication ticket, the device registration request is determined to be invalid and subsequent process steps are not executed.

If the validity of the device registration request is confirmed, the device management unit 233p registers the tenant ID, the device ID, and the attribute information specified in the device registration request in association with each other in the device information storage unit 243p (step S106).

FIG. 7 is a table illustrating an exemplary configuration of the device information storage unit 243p. In FIG. 7, the device information storage unit 243p stores a record for each registered device 10. Each record includes information items such as tenant ID, device ID, device name, device type, and location. The tenant ID and the device ID specified in the device registration request are respectively registered under the tenant ID and the device ID of the device information storage unit 243p. The device name, the device type, and the location are examples of the attribute information of the device 10. The device name may be the name of the model or type of the device 10. The device type may be information succinctly indicating the function of the device 10 identified by the device name. The location is information indicating where the device 10 is installed within the user environment E1.

Next, referring back to FIG. 5, the device management unit 233p transmits an anonymous user registration request specifying the tenant ID and the device ID specified in the device registration request to the user management unit 232p (step S107). In turn, the user management unit 232p automatically generates a user ID (referred to as "anonymous user ID" hereinafter) and a password for the anonymous user according to a predetermined rule (step S108). Then, the user management unit 232p registers a record including the tenant ID specified in the anonymous user registration request and the generated anonymous user ID and password in the user information storage unit 242p (S109).

FIG. 8 is a table illustrating an example in which a record of an anonymous user is registered in the user information storage unit 242p. In FIG. 8, the last record corresponds to a record of the anonymous user. As can be appreciated from FIG. 8, "anonymous" is registered as the role in the record of the anonymous users. By distinguishing the role of the anonymous user from the role of the general user, the authority given to an unspecified user may be easily limited as compared to the authority given to a specified user whose identity is specified, for example.

In FIG. 8, the anonymous user ID is configured to be in a specific format "!anonymous!<Device ID>". In the present embodiment, the above format corresponds to a naming convention for the anonymous user ID. In the present embodiment, the device ID is included in the anonymous user ID. That is, the anonymous user ID and the device ID are associated with each other within the anonymous user ID itself. However, the anonymous user ID and the device ID may be associated with each other in other various ways. For example, a separate storage unit may be provided for storing the anonymous user ID and the device ID in association with each other.

Also, note that in the present embodiment, the exclamation mark "!" included in the anonymous user ID signifies a special symbol. For example, upon receiving a display request to display a list of user information associated with a given tenant ID from the administrator terminal 30, the user management unit 232p may exclude user information with a user ID including the exclamation mark "!" from user information to be displayed. In other words, the exclamation mark corresponds to a special character that cannot ordinarily be used as characters constituting the user ID. By excluding user information of the anonymous user from the user information to be displayed, confusion may be prevented from displaying user information of a user that is not contemplated by the administrator user, for example. Also, even in a case where the administrator user is aware of the existence of an anonymous user, by excluding the user information of the anonymous user, the administrator user may be prevented from erroneously performing operations such as updating or deleting the user information of the anonymous user, for example. Note that the special symbol included in the anonymous user ID does not necessarily have to be an exclamation mark. For example, some other symbol such as an asterisk may be used as the special symbol included in the anonymous user ID. Also, in some embodiments, the anonymous user ID does not have to include a special symbol. In this case, the user management unit 232p may exclude user information of a user with the role "anonymous" from the user information to be displayed.

In the present embodiment, an anonymous user ID is generated for each device 10 that is registered. However, in some embodiments, an anonymous user ID may be generated for each tenant (tenant ID). In this case, the corresponding tenant ID may be included in the anonymous user ID instead of the device ID, for example.

Also, in some embodiments, the above steps S101-S109 may be collectively performed for a plurality of the devices 10. In this case, the process steps executed by the device 10 in FIG. 5 may be executed by the administrator terminal 30, for example. Further, in step S104, the attribute information and the device ID of the plurality of devices 10 may be collectively transmitted to the device management section 233p, for example.

Note that de-registration of the device 10 (deletion of information stored in the device information storage unit 243p) may be performed by replacing the device registration request of step S101 in FIG. 5 with a device deletion request, and replacing the device registration request of step S104 with a device deletion request. In this case, the attribute information of the device 10 does not necessarily have to be specified in steps S101 and S104. In step S106, the device management unit 233p may delete from the device information storage unit 243p a record that contains the tenant ID and the device ID specified in the device deletion request.

Further, in step S107, the device management unit 233p may transmit to the user management section 232p an anonymous user deletion request instead of the anonymous user registration request. In turn, the user management unit 232p may delete from the user information storage unit 242p, a record that contains the tenant ID and the device ID that is specified in the anonymous user deletion request, for example.

Note that in a case where a device 10 and an account of an anonymous user (record of the user information storage unit 242p) have a one-to-one correspondence, the account of the anonymous user may be automatically deleted when the registration of the device 10 is cancelled. In this way, a process of deleting the record of the anonymous user may not have to be separately performed and the operation burden may be reduced, for example.

Figure 9:
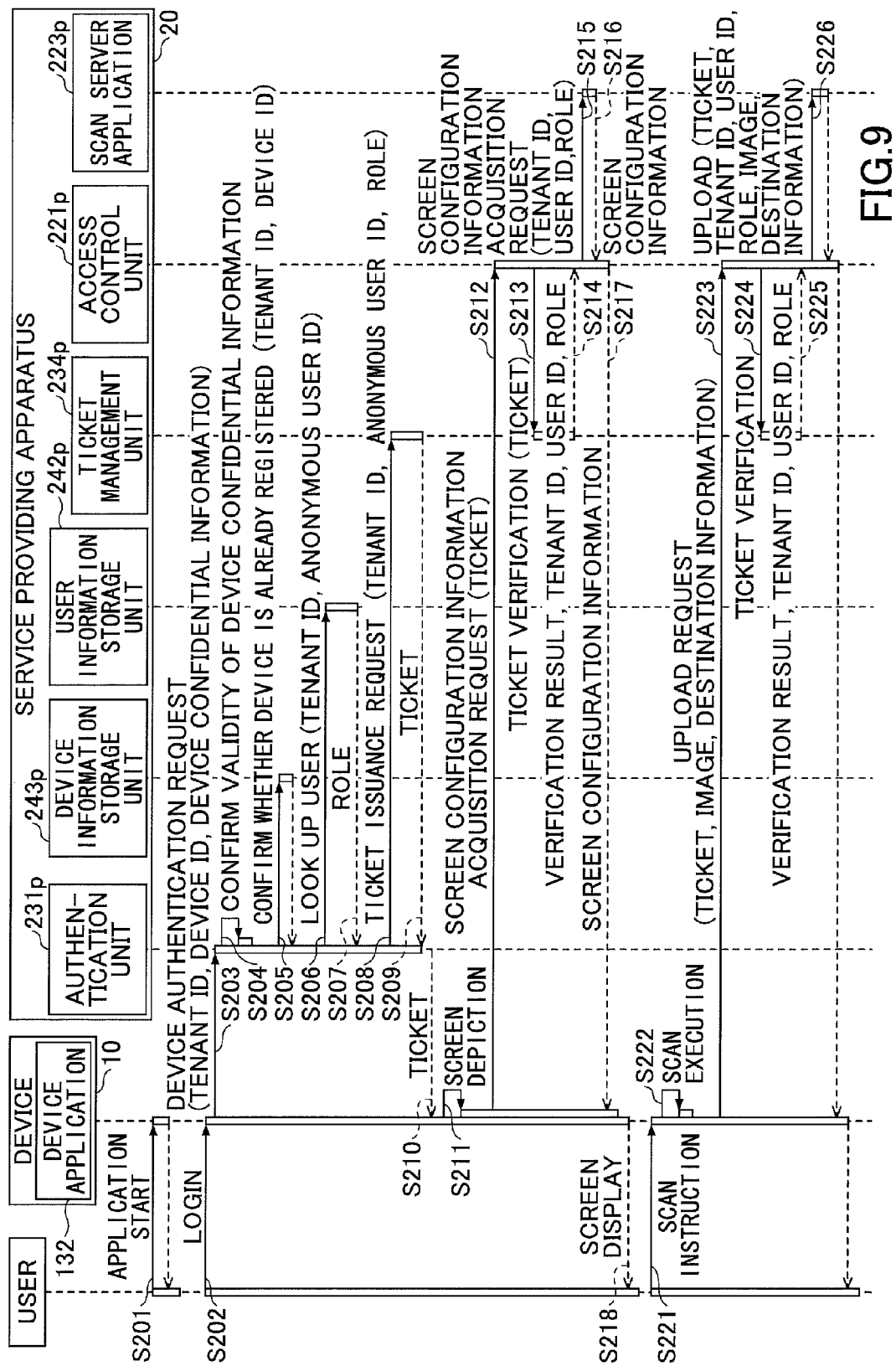
FIG. 9 is a sequence chart illustrating exemplary process steps for executing a job of a cloud scan service according to the first embodiment.

Next, process steps to be performed upon executing a job of the cloud scan service are described. FIG. 9 is a sequence chart illustrating exemplary process steps that may be performed upon executing a job of the cloud scan service according to the first embodiment. Note that the exemplary process steps of FIG. 9 are executed in response to operations input to the apparatus 10 by a user.

In step S201, the device 10 activates the device application 132 in response to an operation instruction from the user. Upon being activated, the device application 132 may display a login screen on an operation panel of the device 10, for example. The login screen may enable input of a user ID and a password, for example.

Then, the user may operate the login screen to input a login instruction (step S202). Note, however, that in the present example, it is assumed that the user ID and the password are not input. In other words, it is assumed that an anonymous login instruction has been input.

In response to the input of the anonymous login instruction, the device application 132 transmits to the authentication unit 231p of the service providing apparatus 20 a device authentication request specifying the tenant ID and the device ID stored in the device 10 and device confidential information (step S203). The device confidential information corresponds to a password that is embedded in the program code of the device application 132. That is, the device confidential information is information indicating that the corresponding tenant of the device 10 is a legitimate purchaser of the device application 132. Note that transmitting the device authentication request in step S203 corresponds to calling a method of the platform API 250.

Upon receiving the device authentication request, the authentication unit 231p confirms the validity of the device confidential information specified in the device authentication request (step S204). For example, the authentication unit 231p may confirm whether the value of the device confidential information matches a value that is stored beforehand in the service providing apparatus 20.

If the device confidential information is valid, the authentication unit 231p determines whether the combination of the tenant ID and the device ID specified in the device authentication request is stored in the device information storage unit 243p (step S205). If the combination of the tenant ID and the device ID is stored in the device information storage unit 243p, the authentication based on the device authentication request is deemed to be successful. Note, however, that a user ID is not specified in the above device authentication request. As such, subsequent steps for determining whether the user has proper authority with respect to the request from the device 10 cannot be performed. Accordingly, the authentication unit 231p executes a process for handling the user of the device 10 that has been successfully authenticated by the device authentication request as an anonymous user.

Specifically, the authentication unit 231p acquires from the user information storage unit 242p the role of the anonymous user that is stored in association with the tenant ID specified in the device authentication request and the anonymous user ID obtained by applying a predetermined naming convention to the device ID specified in the device authentication request (steps S206 and S207). Then, the authentication unit 231p transmits an authentication ticket issuance request specifying the tenant ID, the anonymous user ID, and the role to the ticket management unit 234p (step S208). In turn, the ticket management unit 234p generates the authentication ticket and returns the generated authentication ticket to the authentication unit 231p (step S209). The authentication ticket may be stored in the memory unit 203 in association with the tenant ID, the anonymous user ID, and the role, for example.

Next, the authentication unit 231p returns the authentication ticket generated by the ticket management unit 234p to the device application 132 (step S210). Hereinafter, this authentication ticket may be specified in a request from the device application 132. Thus, by returning the authentication ticket to the device application 132, the device 10 with the device application 132 may be correlated to the anonymous user ID that is associated with the authentication ticket. Note that such a correlation may be performed using other conventional methods used in session management.

Next, the device application 132 starts a depiction process for depicting a screen of the scan cloud service (step S211). To depict the screen of the scan cloud service, the device application 132 transmits a screen configuration information acquisition request specifying the authentication ticket to the scan server application 223p (step S212). The request is received by the access control unit 221p. The access control unit 221p transmits a verification request to verify the authentication ticket specified in the screen configuration information acquisition request to the ticket management unit 234p (step S213).

The ticket management unit 234p verifies the validity of the authentication ticket specified in the verification request. For example, a verification may be made that the authentication ticket specified in the verification request matches one of the authentication tickets managed by the ticket management section 234p, and a verification may be made that the authentication ticket has not yet reached its expiration date. After the authentication ticket is verified, the ticket management unit 234p returns a response to the access control unit 221p, the response including information indicating that the authentication ticket is valid, and the tenant ID, the user ID, and the role stored in the memory unit 203 in association with the authentication ticket (step S214). On the other hand, when the validity of the authentication ticket cannot be confirmed, the ticket management unit 234p returns a response indicating that the authentication ticket is invalid to the access control unit 221p.

If the response indicating that the authentication ticket is invalid is returned, the access control unit 221p terminates the process and refrains from executing subsequent process steps. If the response indicating that the authentication ticket is valid is returned, the access control unit 221p transmits a screen configuration information acquisition request specifying the tenant ID, the user ID, and the role included in the response to the scan server application 223p (step S215).

The scan server application 223p obtains from the screen configuration information storage unit 244p screen configuration information stored in association with the tenant ID and the user ID or the role specified in the screen configuration information acquisition request, and transmits the acquired screen configuration information to the access control unit 221p (step S216). The access control unit 221p then returns the screen configuration information to the device application 132 (step S217). The device application 132 generates a screen based on the screen configuration information, and displays the generated screen on the operation panel of the device 10 (step S218). Note that in the present example, screen configuration information for an anonymous user is obtained, and therefore, a screen for an anonymous user is displayed. For example, the screen for the anonymous user may include fewer setting items compared to a screen for a general user whose identity is specified.

Next, the user inputs scan setting information via the screen and inputs a scan start instruction by operating the operation panel (step S221). In turn, the device application 132 prompts the device 10 to scan a document that is placed on the device 10 (step S222). Next, the device 10 transmits an upload request for uploading the image data of the scanned document to the scan server application 223p (step S223). The upload request specifies the authentication ticket, the image data, and destination information indicating the online storage system 40 corresponding to the uploading destination of the image data.

The upload request is received by the access control unit 221p. The access control unit 221p transmits a verification request to verify the authentication ticket specified in the upload request to the ticket management unit 234p (step S224). The ticket management unit 234p executes a process substantially similar to step S213 and transmits a response including information indicating whether the authentication ticket is valid to the access control unit 221p (step S225).

If a response indicating that the authentication ticket is invalid is returned, the access control unit 221p terminates the process and refrains from executing subsequent process steps. If a response indicating that the authentication ticket is valid is returned, the access control unit 221p transmits an upload request for uploading the image data to the scan server application 223p, the uploading request specifying the tenant ID, the user ID, and the role included in the response, and the image data and the destination information specified in the upload request (step S226).

The scan server application 223p performs an uploading process for uploading the image data to the online storage system 40 indicated by the destination information. In this case, the scan server application 223p executes the uploading process according to the role specified in the upload request. For example, the image data may be uploaded in a folder for an anonymous user within the online storage system 40 that is specified as the uploading destination. Alternatively, a process may be performed on the image data according to the role before the image data is uploaded. For example, a relatively high-grade OCR (optical character recognition) process may be performed on the image data when the user corresponds to a general user or an administrator user whose identity is specified, whereas a relatively low-grade OCR process may be performed on the image data when the user corresponds to an anonymous user whose identity is not specified.

Note that if a user ID and a password are input to the login screen in steps S202, in step S203, the device application 132 transmits a user authentication request specifying the tenant ID stored in the device 10 and the input user ID and password to the authentication unit 231p of the service providing apparatus 20. Note that transmitting the user authentication request corresponds to calling a method of the platform API 250 that is different from the method for implementing the device authentication request described above.

Upon receiving the user authentication request, the authentication unit 231p confirms the validity of the device confidential information, and further determines whether the combination of the tenant ID, the user ID, and the password specified in the user authentication request is stored in the user information storage unit 242p. If the combination of the tenant ID, the user ID, and the password is stored in the user information storage unit 242p, in step S208, the authentication unit 231p transmits an authentication ticket issuance request specifying the tenant ID, the user ID, and the role associated with the user ID to the ticket management unit 234p. In this way, an authentication ticket for a user whose identity is specified may be issued. Note that subsequent process steps may be identical to those described above in connection with the case where the user is an anonymous user.

Note that in some embodiments, instead of determining whether to transmit a device authentication request or a user authentication request based on an input by the user, the authentication request to be transmitted may be predetermined with respect to each device 10. For example, the device application 132 of the device 10 that is set up to transmit a device authentication request may be configured to always transmit a device authentication request to the authentication unit 231p without displaying the login screen for promoting an input of a user ID and a password. On the other hand, the device application 132 of the device 10 that is set up to transmit a user authentication request may be configured to display the login screen for prompting an input of a user ID and a password, and transmit a user authentication request specifying the user ID and password input via the login screen to the authentication unit 231p. In this way, the devices 10 may be divided into a device 10 that can be used by an unspecified user and a device 10 that can only be used by a specified user whose identity is specified.

As described above, according to an aspect of the first embodiment of the present invention, a user may be able to use the cloud scan service via the device 10 without entering a user ID and a password. In this way, operability may be improved upon using a service provided via a network from the device 10. Also, in the case where user information such as a user ID in not input, authority may be limited to the scope of authority assigned to the role of an anonymous user. In this way, an unspecified user whose identity is not specified may be prevented from making unrestricted use of a service provided via a network, for example.

Note that the present invention is not limited to embodiments using a user ID and a password as authentication information, but includes other embodiments using other authentication methods such as biometric authentication, for example.

Also, data to be uploaded from the device 10 does not necessarily have to be image data scanned by the device 10. For example, the data to be uploaded may be data captured by the device 10 or data input to the device 10. In such case, the device 10 does not have to be an image forming apparatus. Also, a request from the device 10 to the service providing apparatus 20 does not necessarily have to be limited to a request for uploading data. That is, the service providing apparatus 20 may be configured to provide a service in response to some other type of request from the device 10.

Note that to eliminate the need for a user to input authentication information, a user ID and a password for an anonymous user may be stored in the device 10 beforehand, and the device application 132 of the device 10 may be configured to transmit a user authentication request specifying the user ID and the password for the anonymous user to the authentication unit 231$p$, for example.

However, in this case, the user ID and password for the anonymous user may have to be set up beforehand for each device 10. Also, in a case where the user ID and password for the anonymous user has to be changed for some reason, the user ID and password stored in each of device 10 has to be changed in addition to changing the registration content of the user information storage unit 242$p$. According to an aspect of the present embodiment, such problems may be avoided.

In the following, a second embodiment of the present invention is described. Note that the descriptions below relate to features of the second embodiment that differ from those of the first embodiment. Thus, it may be assumed that features of the second embodiment that are not specifically mentioned below may be substantially identical to the first embodiment.

Figure 10:
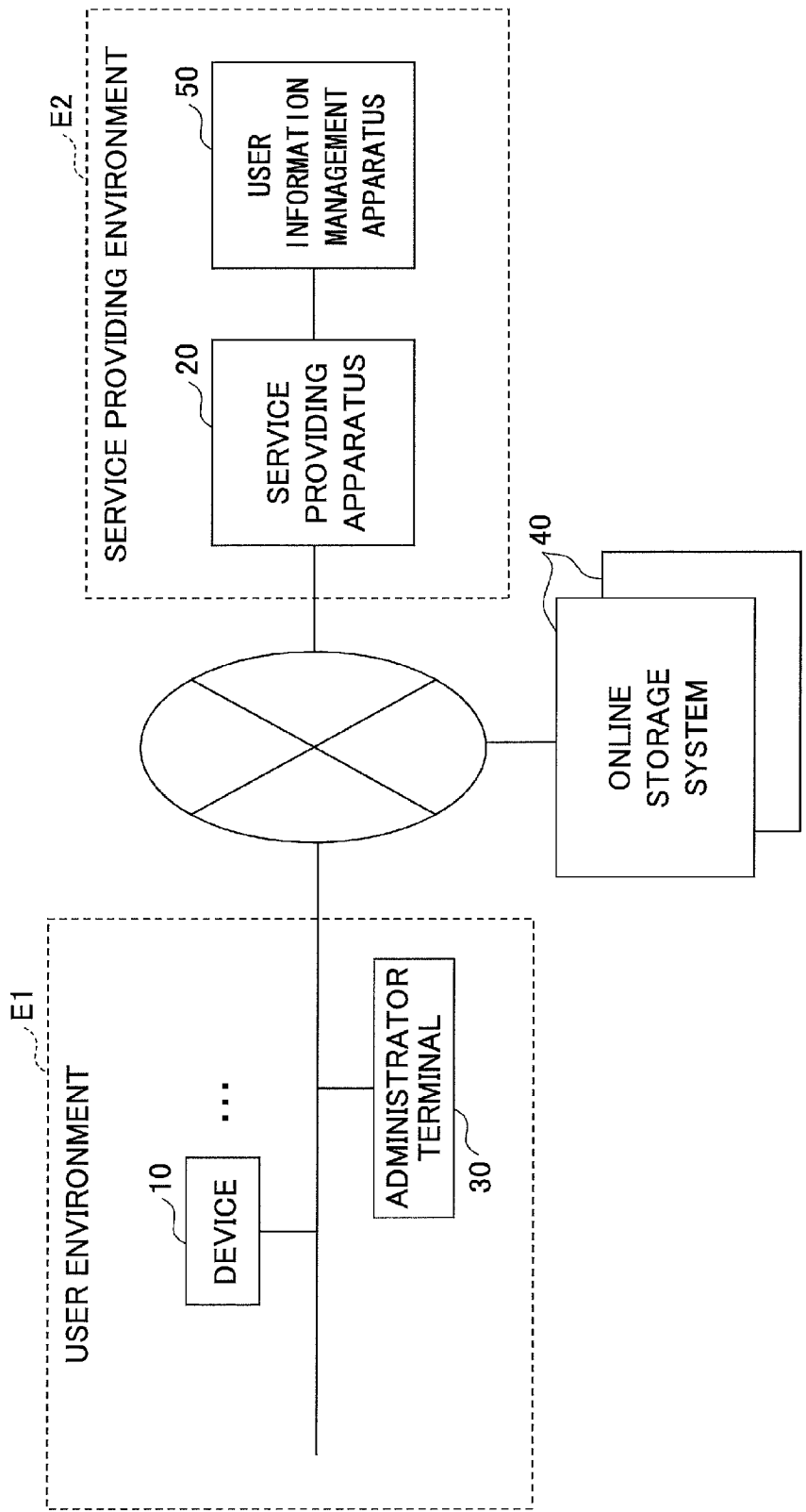
FIG. 10 illustrates an exemplary configuration of an information processing system according to a second embodiment of the present invention.

FIG. 10 is a diagram illustrating an exemplary configuration of an information processing system 2 according to the second embodiment. Note that elements illustrated in FIG. 10 that are substantially identical to or correspond to the elements illustrated in FIG. 1 are given the same reference numbers and descriptions thereof are omitted.

In the information processing system 2 illustrated in FIG. 10, the service providing environment E2 further includes a user information management apparatus 50. The user information management apparatus 50 is connected to the service providing apparatus 20 via a network such as a LAN or the Internet to establish communication with the service providing apparatus 20. Note that the user information management apparatus 50 may include one or more computers having the hardware configuration as illustrated in FIG. 2, for example.

Figure 11:
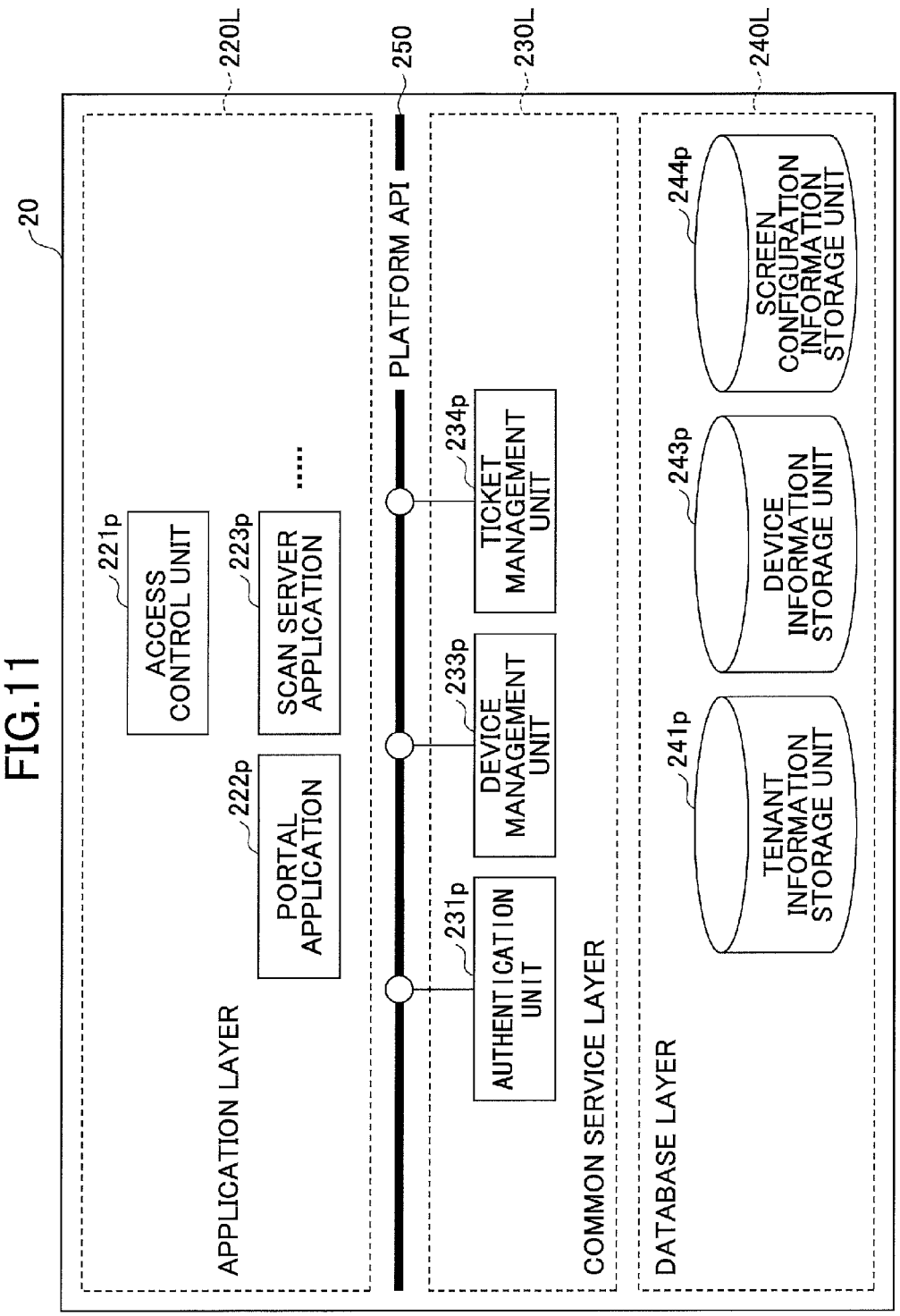
FIG. 11 illustrates an exemplary functional configuration of a service providing apparatus according to the second embodiment.

FIG. 11 is a diagram illustrating an exemplary functional configuration of the service providing apparatus according to the second embodiment. In FIG. 11, the same reference numerals are given to elements corresponding to the elements illustrated in FIG. 3, and descriptions thereof are omitted.

As illustrated in FIG. 11, in the second embodiment, the service providing apparatus 20 does not have to include the user information storage unit 242$p$ and the user management unit 232$p$. In the present embodiment, the user information management apparatus 50 includes the user information storage unit 242$p$ and the user management unit 232$p$.

Figure 12:
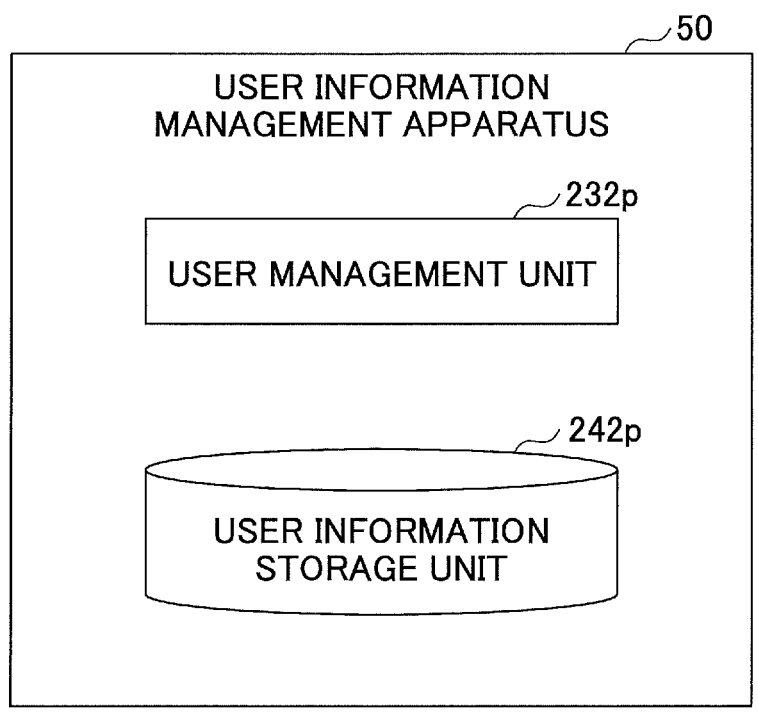
FIG. 12 illustrates an exemplary functional configuration of a user information management apparatus according to the second embodiment.

FIG. 12 is a diagram illustrating an exemplary functional configuration of the user information management apparatus 50 according to the second embodiment. In FIG. 12, the user information management apparatus 50 includes the user information storage unit 242$p$ and the user management unit 232$p$. The user management unit 232$p$ may be implemented by a process executed by a CPU of the user management apparatus 50 based on a program installed in the user information management apparatus 50, for example. The user information storage unit 242$p$ may be implemented by a secondary storage unit of the user information management apparatus 50, for example. In the second embodiment, the user information storage unit 242$p$ and the user management unit 232$p$ are implemented by a computer or a group of computers that is distinct from the service providing apparatus 20.

Figure 13:
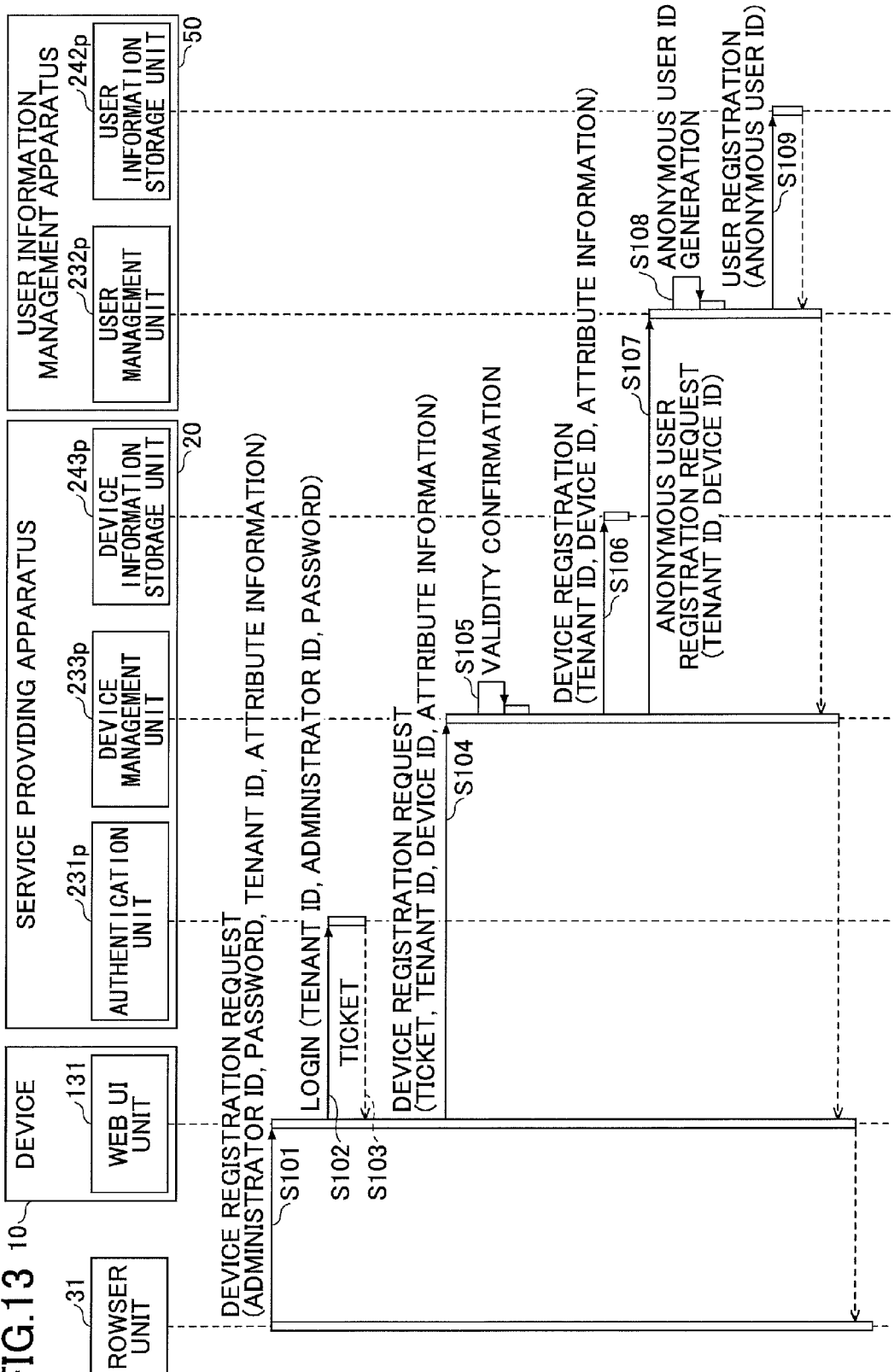
FIG. 13 is a sequence chart illustrating exemplary process steps of a registration process for registering a device that is to cooperate with the service providing apparatus according to the second embodiment.

FIG. 13 is a sequence chart illustrating exemplary process steps of a registration process for registering a device that is to cooperate with the service providing apparatus according to the second embodiment. In FIG. 13, process steps that may be substantially identical to the process steps illustrated in FIG. 5 are given the same reference numbers and their descriptions are omitted.

In step S107 of FIG. 13, the anonymous user registration request is transmitted from the device management unit 233$p$ of the service providing apparatus 20 to the user management unit 232$p$ of the user information management apparatus 50 via a network.

Figure 14:
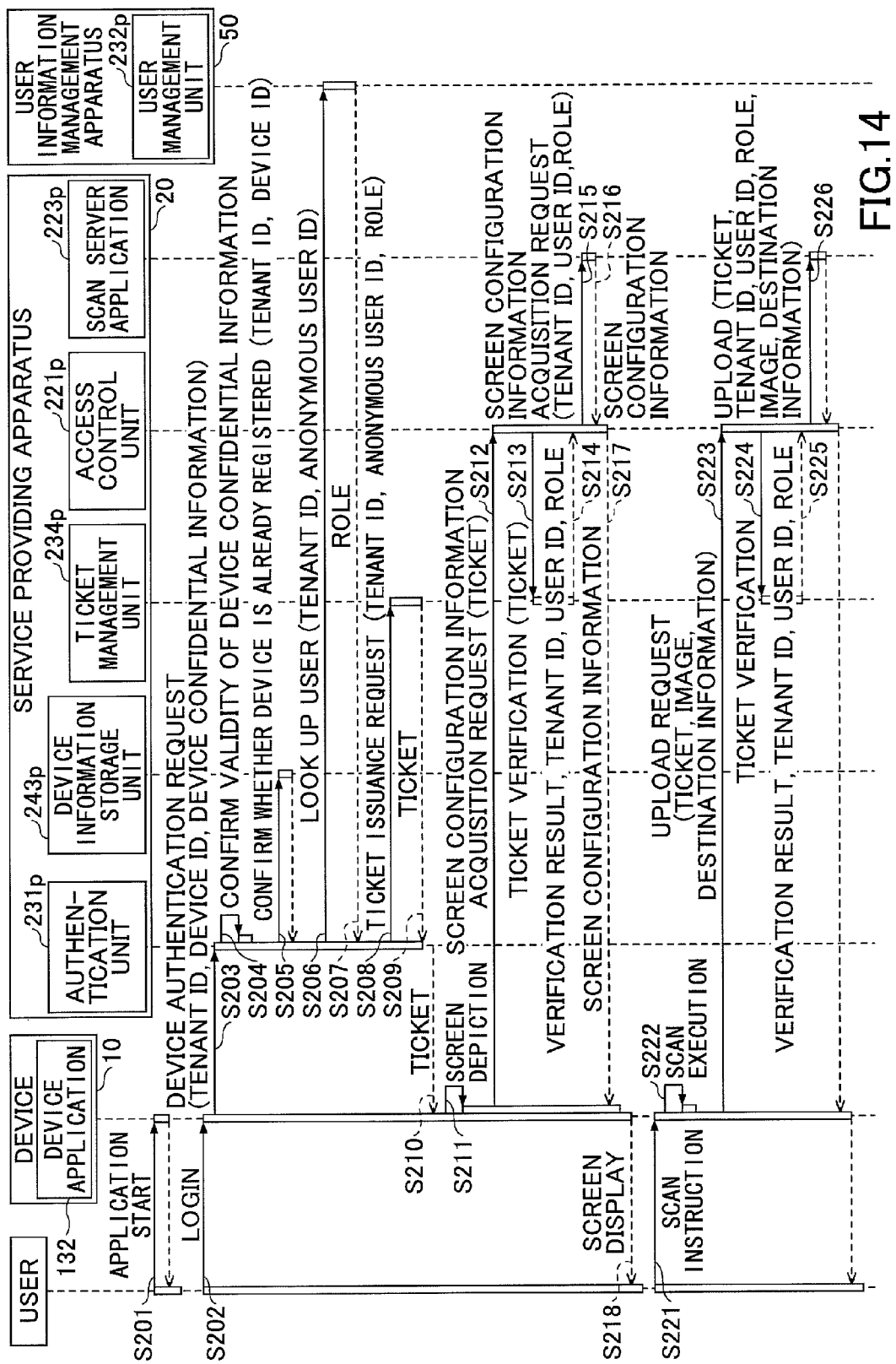
FIG. 14 is a sequence chart illustrating exemplary process steps for executing a job of a cloud scan service according to the second embodiment.

FIG. 14 is a sequence chart illustrating exemplary process steps for executing a job of the cloud scan service according to the second embodiment. In FIG. 14, process steps that may be substantially identical to the process steps illustrated in FIG. 9 are given the same reference numbers and descriptions thereof are omitted.

In step S206 of FIG. 14, the authentication unit 231$p$ of the service providing apparatus 20 transmits a role acquisition request for acquiring the role of the anonymous user to the user management unit 232$p$ of the user information management unit 50 via a network, the role acquisition request specifying the tenant ID specified in the device verification request and the anonymous user ID obtained by applying the predetermined naming convention to the tenant ID specified in the device authentication request. The user management unit 232$p$ acquires from the user information storage unit 242$p$ the role corresponding to the tenant ID and the anonymous user ID specified in the role acquisition request, and returns a response specifying the acquired role to the authentication unit 231$p$ via a network (step S207).

According to an aspect of the second embodiment, the user management unit 232$p$ and the user information storage unit 242$p$ are implemented using a separate computer from the service providing apparatus 20. In this way, for example, even in a case where a service providing apparatus 20 is installed in each country or region such that a plurality of service providing apparatuses 20 are used, the user information may be centrally (globally) managed by the user information management apparatus 50.

Note that the information processing systems 1 and 2 of the above-described embodiments are illustrative examples of an information processing system according to the present invention. The device management unit 233$p$ is an example of a device registration unit. The device information storage unit 243$p$ is an example of a first storage unit. The user management unit 232$p$ is an example of a generation unit and a deletion unit. The scan server application 223$p$ is an example of a processing unit. The user information storage unit 242$p$ is an example of a second storage unit. The device ID is an example of device identification information. The user ID is an example of user identification information. The service providing apparatus 20 is an example of a service providing system. The user information management apparatus 50 is an example of a user management system.

Although the present invention has been described above with reference to certain preferred embodiments, the present invention is not limited to these embodiments, and numerous variations and modifications may be made without departing from the scope of the present invention.

The present application is based on and claims the benefit of priority of Japanese Patent Application No. 2013-229103 filed on Nov. 5, 2013, and Japanese Patent Application No. 2014-223086 filed on Oct. 31, 2014, the entire contents of which are hereby incorporated by reference.

What is claimed is:

1. An information processing system including at least one computer, the information processing system comprising: an administrator terminal including a browser unit implemented by an application; a device; and a service providing apparatus connected to the administrator terminal and the device via a network, the service providing apparatus including a processor that executes a program, stored in a memory, to implement a device registration unit configured to store device identification information of the device in a first storage unit in response to a device identification information registration request initiated from the browser unit; a generation unit configured to generate user identification information of an unspecified user of the device that has the device identification information stored in the first storage unit; an authentication unit configured to perform authentication in response to an authentication request from the device that has the device identification information stored in the first storage unit, and associate user identification information of a specified user specified in the authentication request with the device when the authentication performed in response to the authentication request based on information specified in the authentication request is successful; and a processing unit configured to execute a process according to the user identification information associated with the device by the authentication unit, the process being executed in response to a request transmitted from the device that has been successfully authenticated based on the authentication request; wherein when the authentication unit receives from the device an authentication request that does not specify user identification information, the authentication unit associates the user identification information of the unspecified user generated by the generation unit with the device, and wherein the generation unit generates the user identification information of the unspecified user in response to the device identification information registration request, and stores the generated user identification information of the unspecified user in a second storage unit in association with the device identification information specified in the device identification information registration request; wherein the authentication request that specifies user identification information and the authentication request that does not specify user identification information correspond to different call requests for calling different interfaces.

2. The information processing system as claimed in claim 1, further comprising: a deletion unit configured to delete the user identification information associated with the device identification information from the second storage unit in response to a device identification information deletion request.

3. An information processing system comprising: an administrator terminal including a browser unit implemented by an application: a device: a service providing system including at least one computer connected to the administrator terminal and the device via a network: and a user management system including at least one computer; wherein the service providing system includes a processor that executes a program, stored in a memory, to implement a device registration unit configured to store device identification information of the device in a first storage unit in response to a device identification information registration request initiated from the browser unit: wherein the user management system includes another processor to implement a generation unit configured to generate user identification information of an unspecified user of the device that has the device identification information stored in the first storage unit; wherein the processor of the service providing system further implements an authentication unit configured to perform authentication in response to an authentication request from the device that has the device identification information stored in the first storage unit, and associate user identification information of a specified user specified in the authentication request with the device when the authentication performed in response to the authentication request based on information specified in the authentication request is successful; and a processing unit configured to execute a process according to the user identification information associated with the device by the authentication unit, the process being executed in response to a request transmitted from the device that has been successfully authenticated based on the authentication request; and wherein when the authentication unit receives from the device an authentication request that does not specify user identification information, the authentication unit associates the user identification information of the unspecified user generated by the generation unit with the device, and wherein the generation unit generates the user identification information of the unspecified user in response to the device identification information registration request, and stores the generated user identification information of the unspecified user in a second storage unit in association with the device identification information specified in the device identification information registration request; wherein the authentication request that specifies user identification information and the authentication request that does not specify user identification information correspond to different call requests for calling different interfaces.

4. An information processing method that is implemented by an information processing system including an administrator terminal having a browser unit implemented by an application, a device, and a service providing apparatus connected to the administrator terminal and the device via a network, the service providing apparatus including a processor that executes a program, stored in a memory, to implement the information processing method comprising: a device registration step of storing device identification information of the device in a first storage unit in response to a device identification information registration request initiated from the browser unit: a generation step of generating user identification information of an unspecified user of the device that has the device identification information stored in the first storage unit; an authentication step of performing authentication in response to an authentication request from the device that has the device identification information stored in the first storage unit, and associating user identification information of a specified user specified in the authentication request with the device when the authentication performed in response to the authentication request based on information specified in the authentication request is successful; and a processing step of executing a process according to the user identification information associated with the device by the authentication step, the process being executed in response to a request transmitted from the device that has been successfully authenticated based on the authentication request; wherein when an authentication request that does not specify user identification information is received from the device, the authentication step includes associating the user identification information of the unspecified user generated in the generation step with the device, and wherein the generation step generates the user identification information of the unspecified user in response to the device identification information registration request, and stores the generated user identification information of the unspecified user in a second storage unit in association with the device identification information specified in the device identification information registration request; wherein the authentication request that specifies user identification information and the authentication request that does not specify user identification information correspond to different call requests for calling different interfaces.

\* \* \* \* \*